United States Patent [19]

Gasser et al.

[11] Patent Number: 5,154,791

[45] Date of Patent: * Oct. 13, 1992

[54] METHOD FOR BONDING OR POTTING SUBSTRATES

[75] Inventors: Oswald Gasser; Erich Wanek, both of Seefeld; Klaus Ellrich, Wörthsee; Rainer Guggenberger, Herrsching, all of Fed. Rep. of Germany

[73] Assignee: Thera Patent GmbH & Co. KG Gesellschaft fur industrielle, Fed. Rep. of Germany

[ * ] Notice: The portion of the term of this patent subsequent to Apr. 17, 2007 has been disclaimed.

[21] Appl. No.: 497,438

[22] Filed: Mar. 22, 1990

[30] Foreign Application Priority Data

Mar. 23, 1989 [DE] Fed. Rep. of Germany ....... 3909688

[51] Int. Cl.⁵ ................. B65H 81/00; B05D 3/06
[52] U.S. Cl. ................ 156/273.3; 156/273.5; 156/275.5; 156/275.7; 156/277; 156/326; 427/561; 427/517; 427/510
[58] Field of Search ............ 427/42, 53.1, 54.1, 427/44, 43.1; 156/277, 326, 273.3, 275.5, 275.7, 272.2, 272.6, 272.8

[56] References Cited

U.S. PATENT DOCUMENTS

| | | | |
|---|---|---|---|
| 4,356,050 | 10/1982 | Crivello et al. | 156/273.3 |
| 4,849,048 | 7/1989 | Inagaki et al. | 156/275.5 |
| 4,880,486 | 11/1989 | Maeda | 156/275.5 X |
| 4,880,662 | 11/1989 | Habrich et al. | 427/54.1 |
| 4,916,805 | 4/1990 | Ellrich et al. | 156/273.3 X |

*Primary Examiner*—David A. Simmons
*Assistant Examiner*—Chester T. Barry
*Attorney, Agent, or Firm*—Frost & Jacobs

[57] ABSTRACT

A method for bonding or potting substrates by means of cationically polymerizable masses being activated before joining or potting by irradiation with visible light and curing after joining or potting of the substrates without the irradiation being continued is described as well as an apparatus for executing this method. By irradiation with light having a wavelength of from 400 to 600 nm for photo-activation of said masses, a prolonged pot life of said masses without reducing their wetting ability during pot life is obtained such that the masses are unlimitedly applicable for more than 30, preferably more than 100 sec. after exposure is finished. The apparatus according to the invention comprises a source of irradiation which exclusively emits light having a wavelength of >400 nm.

14 Claims, No Drawings

METHOD FOR BONDING OR POTTING SUBSTRATES

BACKGROUND OF THE INVENTION

The invention relates to a method for bonding or potting substrates by means of cationically polymerizable masses being activated before joining or potting by irradiation with visible light and curing after joining or potting of the substrates without the irradiation being continued.

Such methods have been known from EP-A-0 279 199 as well as from JP-A-61-98740, for instance. However, ultraviolet radiation is exclusively used therein for photo-activating the cationically polymerizable masses. At an UV-irradiation period of 10 sec, the known masses gelate after 20 to 30 s at room temperature, but after less than 10 s at 100° C.

Since UV-curable masses harden quickly on the locations accessible to UV-radiation, but do not harden at all or much more slowly in the regions being less accessible or masked, a second hardening mechanism is necessary which is caused by initiators of the thermal polymerization and requires higher temperatures. However, the temperature load being related to thermal polymerization reduces the statistical life expectancy of the substrates in many fields of application, for instance in bonding or potting electronic components.

The above-mentioned references had proposed to irradiate the UV-curable masses in the application means, that is, before they are applied onto the substrate and to supply the masses already being photo-activated to the substrate or a casting mould only then for reducing the problems related to inhomogeneous photo-activation due to UV-irradiation. This results in uniform radiation over the whole mass cross-section whereas it is avoided that masked regions appear. However, the drawback inherent to these methods consists in that the pot life of the photo-activated masses is shortened too much for many fields of application. Since the masses already gelate 20 to 30 sec after UV-irradiation is finished, the pot life is considerably shorter than 20 to 30 sec as a marked reduction of initial adhesiveness, a marked reduction of wetting ability and a marked increase in viscosity can be noticed in the masses even before the onset of gelification.

Moreover, the UV-curable masses used in the known methods are sensitive with respect to atmospheric oxygen. Further, strongly dyeing the adhesive mass as is often demanded for chip adhesives may reduce the depth of penetration of the UV-radiation, consequently prevent complete hardening and later result in corrosion phenomena.

It has been known from DE-PS 26 18 897 as well as from DE-OS 30 35 807 and 30 46 034 to use cationically polymerizable masses for bonding or potting substrates which are hardened under the influence of visible light situated in the wavelength range of 380 to 800 nm. These masses contain as photo-initiators diaryl iodonium salts or triaryl sulphonium salts respectively together with a photo-sensitizer in the form of a cationic or basic dye. Irradiation times of 5 to 10 min are specified in the examples of DE-OS 30 46 034. Complete hardening of the masses irradiated in this manner occurs at room temperature 1 to 3 hours after irradiation has finished.

From DE-OS 36 43 400 and 37 24 838, there have also been known methods for bonding substrates by means of cationically polymerizable masses being activated before joining by irradiation with light in the wavelength range of 200 to 700 nm and curing without further irradiation when being left to stand in the dark. These masses had been irradiated for about 1 to 3 minutes and left to stand until complete hardening under a pressure of 1 to 200 MPa at room temperature for 2 to 36 hours. The gelification point of the masses had been reached after 210 sec., calculated from the beginning of irradiation. As photo-initiators, there had been used, in these masses, aryl sulphinates, diaryl iodonium salts and triaryl sulphonium salts, respectively together with sensitizers in the form of dyes or camphor quinone.

SUMMARY OF THE INVENTION

It is an object of the present invention to provide a method for bonding or potting substrates as mentioned in the foregoing in order to successfully prolong the pot life of the photo-activated masses on the one hand without reducing the wetting ability of the masses during pot life and obtain complete curing of the masses after joining or potting respectively of the substrates as quickly and at as low temperatures as possible. This object is met in accordance with the invention by carrying out exposure for photo-activating the masses by irradiation with light being situated in the wavelength range of 400 to 600 nm so long that the masses are unlimitedly applicable for more than 30 sec. after exposure is finished.

Compared to the known methods described above, the method according to the invention allows to homogeneously harden cationically polymerizable masses in large layer thicknesses for the first time, namely up to some centimeters, with a considerable prolongation of the pot life during which the masses may be applied unlimitedly being obtained simultaneously. In accordance with the invention, the pot life is at least 30 sec., preferably 100 sec. at least and reaches values of about 60 minutes.

Due to the fact that visible light is used, considerably higher storage stability of the photo-activated masses, compared to UV-irradiation, and accordingly prolonged processibility is obtained; at the same time, it is obtained that complete curing may be carried out within a period to be regulated within a large range of less than 2 min to more than 12 h according to temperature adjustment.

Due to the longevity of the activated species produced through exposure to visible light, it is possible to expose the masses utilized before they are applied to the surfaces of the substrates to be bonded or potted. Consequently, the drawback being constituted by adhesive layers not, or not completely, hardened in masked zones cannot occur in accordance with the invention. Both curing stages, that is, photo-induced activation with light having a wavelength situated in the range of 400 to 600 nm as well as final hardening are carried out, in accordance with the invention, uniformly through the whole polymerizable mass. When the photo-induced exposure is executed in accordance with the invention before applying the masses on the substrate surfaces, the masses may be irradiated in a variety of transparent containers. These containers do no longer absolutely have to consist of quartz glass or UV-transparent acrylic glass, as is the case in the known methods, but may also be manufactured from slightly pigmented UV-stabilized plastics absorbing up to the near visible range. Substantially less expensive supply and application containers may be produced from such plastics like polycarbonates, for instance, than from quartz glass, for instance, which has hitherto had to be used.

A further advantage of the method in accordance with the invention consists in that the masses may be activated by means of a simple commercial lamp in a sufficiently transparent supply vessel, in spatial separation from the application device. This supply vessel may now be emptied into any commercial dosage dispenser during a sufficient period of time, after which the photo-activated masses may be applied over a longer period. Moreover, a sufficienty long period of time is available for joining many substrates when the masses are treated in accordance with the method of the invention.

Despite the careful activation, the masses activated with visible light in accordance with the invention harden extremely quickly after joining or potting respectively of the substrates at an increased temperature, preferably at a temperature of $>60°$ C. and $<140°$ C., namely, within a period of up to 10 min, preferably within a maximum period of 2 min. However, it is equally possible to execute hardening at room temperature over a longer period of time, that is, more than 12 h, for instance.

DESCRIPTION OF PREFERRED EMBODIMENTS

In accordance with the invention, photo-activation of the cationically polymerizable masses used may be controlled by varying the exposure time or the energy dose of the light sources used so that there is produced sufficient reactive species for subsequent quick hardening on the one hand, but that, on the other hand, no polymerization occurs on the surface with a film being formed to prevent good wetting of the substrates and thus to render the masses unsuitable, which occurs in activation with light of shorter wavelength ($<400$nm). Masses having to be activated with shorter-wave UV-light, have to be further processed immediately after activation according to the teaching disclosed in EP-A-0 279 199.

The activation of the masses utilized which precedes joining or potting respectively in accordance with the invention accelerates the subsequent hardening, which may be carried out both at room temperature and under heat supply so that it is carried out substantially quicker than in the hitherto known methods.

Advantageous embodiments of the method according to the invention consist in activating the masses by irradiation with light having a wavelength of 420 to 580 nm, preferably with light having a wavelength of 480 to 520 nm. Irradiation time is preferably situated between 0.5 to 300 sec. Advantageous further embodiments of the method in accordance with the invention additionally consist in that, as a cationically polymerizable mass, a flowable, photo-activatable mass having a viscosity of 0.05 to 1000 Pa.s is used. A good compromise between processibility and wetting properties of the masses used is attained at a viscosity of said masses of 0.1 to 500 Pa.s as measured before activation, while a range of 0.4 to 200 Pa.s has turned out to be especially advantageous.

Photo-polymerizable masses substantially polymerizing according to a cationic reaction mechanism are known to the person skilled in the art from EP-A-0 094 915, 0 109 851 and 0 182 744.

A mixture is purposefully used as the photo-polymerizable mass in accordance with the invention which consists of:
a) 10 to 99.95 wt.-%, preferably 70 to 98 wt.-%, of at least one cationically hardenable resin and/or cationically polymerizable monomer;
b) 0.05 to 10 wt.-%, preferably 2 to 6 wt.-%, of at least one photo-initiator forming Lewis or Brönsted acids under the influence of light;
c) 0 to 89.95 wt.-%, preferably 0 to 28 wt.-%, of one or several fillers, thixotroping agents, coupling agents and/or other common additives.

One may also use such photo-polymerizable masses (resins and/or monomers) which also follow a radicalic hardening mechanism, in addition to a cationic one. Such adhesive masses consist of:
a) 10 to 89.9 wt.-% of at least one cationically hardenable resin and/or cationically polymerizable monomer;
b) 0.05 to 10 wt.-% of at least one photo-initiator forming Lewis or Brönsted acids under the influence of light;
c) 0. to 89.9 wt.-% of one or several fillers, thixotroping agents, coupling agents and/or other common additives;
d) 10 to 80 wt.-% of at least one resin and/or monomer polymerizing according to a radicalic polymerization mechanism;
e) 0.05 to 5 wt.-% of at least one photo-initiator producing radicals under the influence of light;
f) optionally 0.05 to 5 wt.-% of at least one photo-sensitizer and/or activator.

Therein, the resins and/or monomers polymerizing according to a radicalic polymerisation mechanism preferably consist of the acrylic acid and/or methacrylic acid esters of mono or polyvalent alcohols, the acrylic acid and/or methacrylic acid esters of polyvalent alcohols being especially preferred.

Cationically hardenable resins or cationically polymerizable monomers such as mono or polyfunctional vinyl ethers and vinyl esters are suitable for use in the method according to the invention. Suitable vinyl ethers are trimethylol propane trivinyl ether, ethylene glycol divinyl ether and cyclic vinyl ethers. Triethylene glycol divinyl ether is especially suitable.

Compounds being generally well suitable are the vinyl esters and the vinyl ethers of polyfunctional alcohols, with polyethylene and polypropylene glycols having vinyl ether terminal groups are preferably employed.

Further, cationically polymerizable heterocyclic compounds such as epoxides are well suitable. The glycidyl ethers of mono and polyvalent alcohols, e.g. the bisphenol-A diglycidyl ethers are preferably used. The di- and poly epoxides of cyclo-aliphatic compounds are especially suitable for setting up a high reactivity, such as the glycidyl ethers and $\beta$-methylglycidyl ethers of cyclo-aliphatic diols and polyols.

One may further use as glycidyl compounds the glycidyl esters of carboxylic acids, of di- and polycarboxylic acids in particular such as the glycidyl esters of succinic acid, adipic acid and phtalic acid.

Examples for especially reactive glycidyl compounds are the diepoxides of vinyl cyclohexane and of dicyclopentadiene as well as 3-(3', 4'-epoxycyclohexyl)-8,9-epoxy-2,4-dioxyspiro(5.5)undecane and 3,4-epoxycyclohexylmethyl-3', 4'-epoxycyclohexylcarboxylate.

Preferred epoxide resins are optionally pre-prolonged and/or pre-polymer diglycidyl ethers of divalent phenols or divalent aliphatic alcohols having two to four C-atoms. The pre-prolonged diglycidyl ethers of 2,2-bis-(4-hydroxyphenyl)propane are especially preferably used.

Quite generally, the photo-initiators known for cationic polymerization are suitable as photo-initiators forming Lewis or Brönsted acids under the influence of light, such as aryl diazonium salts, diaryl iodonium salts, triaryl sulphonium salts as well as metallocene-like complex salts if they are activatable with light having a wavelength situated in the range of 400 nm to 600 nm together with an optional photosensitizer for this wavelength range.

A class of photo-initiators preferred for the purposes in accordance with the invention is constituted by the metallocene complex salts known from EP-A-0 182 744, such as compounds (Ia) and (Ib) in particular:

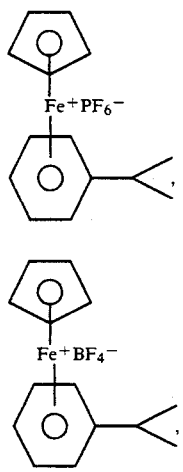

A further preferred class of photo-initiators for cationic polymerization is constituted by the diaryl iodonium salts having the formula:

$$Ar_2J^+X^-,$$

wherein Ar is an optionally substituted arene, for instance benzene, toluene, xylene, ethyl benzene, methoxybenzene, naphtalene, 1,2-dihydronaphthalene, phenanthrene, anthracene, 9,10-dihydroanthracene, diphenylene, biphenyl, cumene; and wherein $X^-$ is a complex anion, such as $BF_4^-$, $PF_6^-$, $AsF_6^-$, $SbF_6^-$, preferably $BF_4^-$ or $PF_6^-$.

The diaryl iodonium salts are preferably employed together with photo-initiators generating radicals under the influence of light and absorbing light having a wavelength of >400 nm. Suitable photo-initiators of this kind are α-diketones, benzil ketals as well as acyl phosphine compounds having the general formula II:

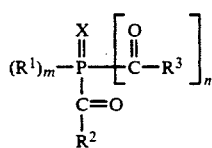

wherein m=1, n=1 and x=O, or
m=2, n=0 and x=O or S,
$R^1$ a straight chain or branched $C_{1-6}$ alkyl residue, a cyclohexyl, cyclopentyl, phenyl, naphtyl or biphenylyl residue, a cyclopentyl, cyclohexyl, phenyl, naphtyl or biphenylyl residue being substituted by F, Cl, Br, J, $C_1-C_4$alkyl and/or $C_1-C_4$-alkoxyl, a S or N-containing 5 or 6 member heterocyclic ring,
$R^2$ and $R^3$, being similar or different, a cyclohexyl, cyclopentyl, phenyl, naphthyl, or biphenylyl residue, a cyclopentyl, cyclohexyl, phenyl, naphthyl or biphenylyl residue being substituted by F, Cl, Br, J, $C_1-C_4$ alkyl and/or $C_1-C_4$ alkoxyl, or a S or N-containing 5 or 6 member heterocyclic ring or
$R^2$ and $R^3$ being linked to each other to form a ring comprising 4 to 10 carbon atoms and possibly being substituted by 1 to 6 $C_{1-4}$ alkyl residues.

In the masses used in accordance with the invention, there may be contained fillers such as powders of aluminium oxide, silicon dioxide, calcium carbonate, titanium dioxide, barium sulfate, mica and the like, while powdery silicon dioxide having a specific surface of 50 to 450 m²/g may preferably be contained as a thixotroping agent. The fillers employed are preferably silanized. The substantially known silane coupling agents such as γ-methacryloyloxypropyl trimethoxysilane and glycidyloxypropyltrimethoxysilane may be used as silanizing agents.

Other common additives for the adhesive masses used in accordance with the invention are for instance peroxides, sensitizers such as perylene compounds, pigments, dyes, antioxidants and the like.

Since visible light is able to penetrate into the photoactivatable masses much deeper than ultraviolet radiation, the masses according to the invention do not have to be activated in the dosing and application means as is the case in the prior art, but they may already be activated in a supply container, which may spatially be situated remote from the dosing and application means and be connected to the dosing and application means just via tubes and pipes. Conveying means of the known kind such as pumps may be integrated in the conveying path for the photo-active masses formed by the pipes and tubes.

The invention will be explained in detail using the following examples.

EXAMPLE 1

A resin composition is produced by mixing uniformly 50 parts by weight 3,4-epoxycyclohexylmethyl-3',4'-epoxycyclohexylcarboxylate, 50 parts by weigth of a low-molecular bisphenol-A-diglycidylether (Araldit ® GY250 by Ciba-Geigy), 3 parts by weight ($\eta^5$-2,4-cyclopentadiene-1-yl)-(1,2,3,4,5,6-) -(1-methylethyl)-benzene-iron(1+)-hexafluorophosphate(1-) (Irgacure ® 261 by Ciba-Geigy) and 5 parts by weight of powdery hydrophobed silica having a specific surface of 71 m²/g and a particle size of <100 nm (Silica R-202 of Degussa).

The resin composition comprises a viscosity of 10 Pa.s (Haake-Viskosimeter Rotovisko RV 100, PKI 0.5/28, 10%D). The resin composition is subsequently applied to a printed circuit board by means of a dispenser fixed on a SMD (Surface Mounted Device) manipulator from Fritsch to form a stable adhesive drop between the contact terminals. The adhesive drop comprises a diameter-height ratio of about 2:1. This process is repeated for all component joints (about 100), which requires about 3 min on the whole.

The adhesive drops are subsequently activated with an irradiation device emitting actinic light in the range of 400 to 600 num (DELO-LUX 450 from Delo Kunststoffchemie GmbH & Co. KG) over a period of 4 min. Afterwards the circuit board is charged with electronic components which necessitates time requirements of 5 min on the whole. The circuit board charged in this manner is brought into a drag soldering bath (Zevatron Typ EFT-1) after 18 hours at a temperature of about 23° C. (room temperature). The circuit board is fed, at maximum speed rate 10, into a container comprising molten solder and being heated to 250° C.; it is left to be immersed therein for 10 s for soldering the electrode parts of the components to be soldered to the connection terminals by means of the soldering agent. No components are detached from the printed circuit board during the process, and flawlessly soldered components are obtained. Immersion is repeated five times without detachment of components from the printed circuit board occuring.

COMPARATIVE EXAMPLE 1

A photo-activatable epoxide mass is produced by homogeneously mixing 100 parts by weight of a cycloaliphatic diepoxide (Araldit ® CY 179 Ciba-Geigy), 100 parts of a low-molecular bisphenol-A-diepoxide (Araldit ® MY 790 by Ciba-Geigy), 4 parts of a photoinitiator (Irgacure ® 261 by Ciba-Geigy) and 0.5 parts anthracene as a sensitizer.

The described mass is irradiated using a powerful mercury vapour lamp (Blue-Point from Hönle) which is provided, at the output of the flexible optical light guide, with a UV-band pass filter UG 1 (DIN designation BP 351/80, thickness 1 mm) for filtering out all visible range light and exclusively admitting UV-radiation. One drop of the mass as described is applied to white ground and exposed (activated) by filter UG 1 at a distance of 5 mm.

A test series served for finding out the point of time being sufficient for activating the mass so that it subsequently hardens at 110° C. This curing process at increased temperature already occurs after 6 to 7 sec. of activation under UV-light, albeit as film-formation without complete and thorough hardening. Curing at increased temperature is complete after an activation of 9 sec.

Now, one drop of the mass described is applied to white ground and exposed (activated) by the filter for 9 sec. at a distance of 5 mm. In the course of this activation, the mass remains fluid and gelates within further 15 to 20 sec. at a room temperature of 23° C. If UV-light is used, the pot life of this mass accordingly amounts to 15 to 20 sec. A pot life of 15 sec. is obtained after 2 sec. of activation when no filter is used.

EXAMPLE 2

A photo-activatable epoxide mass is produced just like in example 1. One drop of this mass is irradiated with a mercury vapour lamp (Blue-Point from Hönle), which is then provided with a filter GG 395 at the output of the flexible optical light guide. This filter is opaque to the UV spectral portion and exclusively lets pass light over 400 nm. One drop of the mass described is applied on white ground and exposed (activated) by filter GG 395 at a distance of 5 mm. A test series served for finding out the point of time being sufficient for activating the mass so that it subsequently hardens at 110° C. This hardening process at increased temperature already completely occurs after an activation of 2 sec.

Now one drop of the mass described is applied on white ground and exposed (activated) by filter GG 395 at a distance of 5 mm. The mass remains fluid in the course of this activation and gelates after further 15 min at a room temperature of 23° C. When visible light is used for activation, the pot life of this mass is accordingly 15 min.

COMPARATIVE EXAMPLE 2

A photo-activatable epoxide mass is produced as in example 1. A commercial polystyrene cuvette from v. Minden, Laboratory Equipment, having a diameter of 10 mm and a radiation transparency of 350 nm to 800 nm is filled with the mass up to a height of 5 mm. This cuvette is exposed (activated) with the mercury vapour lamp (Blue-Point from Hönle), which is provided, at its output, with a UV-band pass filter UG 1 having a thickness of 1 mm, in immediate contact with the cuvette. The cuvette is exposed twice for 10 sec., a film (part-gelated mass) forming on the inner side of the cuvette wall facing the optical light guide. The remaining liquid mass present in the cuvette neither gelates at room temperature nor at an increased temperature. This example shows that a hardening in the first irradiated layer occurs, when UV-light having low penetration depth is used, without an activation occuring in deeper layers which would cause subsequent gelification at room temperature or increased temperature. Thus, the use of UV-light is not suitable for this activation in a cuvette.

EXAMPLE 3

A photo-activatable epoxide mass is produced just like in example 1. This mass is filled into a polystyrol cuvette (v.Minden, Laboratory Equipment) up to a height of 5 mm.

The cuvette is exposed in immediate contact by means of a mercury vapour lamp (Blue-Point of Hönle) which is provided with a filter GG 395 at the output of the flexible optical light guide and accordingly just lets pass light in the visible wavelength range. This exposure was carried out four times for 10 sec. (activation). After this irradiation, no gelification (no film-formation) could be ascertained on the wall facing the optical light guide, and the mass in the cuvette gelated after further 12 min at a room temperature of 23° C. Thus, the pot life of the photo-polymerizable mass in this example is 12 min, if light in the visible wavelength range is used.

EXAMPLE 4

A photo-activatable epoxide mass like the one of example 1 is produced. One drop of this mass is applied to white ground and exposed (activated) for 9 sec. with a lighting device (Elipar II from ESPE GmbH & Co. KG), which exclusively emits light in the visible wavelength range of 400 to 500 nm, at a distance of 5 mm. In the course of this irradiation, the mass remains invariably fluid and gelates after 11 min at a room temperature of 23° C. Accordingly, a pot life of 11 min results when the described mass is used in this test set-up.

As results from the foregoing examples and comparative examples, the following drawbacks of the methods operated with UV-radiation are surprisingly simultaneously eliminated in applying the method according to the invention, namely, (1) film-formation on the mass surface, (2) too small depth of penetration of the activating radiation and (3) quick gelification or too short pot life of the photo-activated masses respectively.

The following table specifies the exposure conditions and the pot lives attained thereby:

TABLE

| example | exposure | pot life | final hardening (110° C.) |
|---|---|---|---|
| comparative example 1 | 9 sec. UV (366 mn) | 10 to 20 sec. | yes |
| | 2 sec. UV + visible light | 15 sec. | yes |
| example 2 | 2 sec. visible light (400 to 600 nm) | 900 sec. | yes |
| example 4 | 9 sec. visible light (400 to 500 nm) | 660 sec. | yes |

The advantages attainable through the method in accordance with the invention will be explained by way of example in the following from several cases of application:

In SMT-technique (Surface Mounted Technology) very quick automatic charging apparatus allow to place about two adhesive agent points per second and to simultaneously charge the circuit board being previously completely provided with adhesive agent with two components per second, with the time for conveying the adhesive masses from the place of photo-activation to the circuit board not being taken into account. A small-format SMD circuit board comprises an average number of about 100 components. Consequently, there results a time of about 50 sec. for placing all adhesive points, and, again without the time for conveying the circuit board further being taken into account, another 50 sec. for the charging process, that is 100 sec. on the whole. Since the last component must also be placed onto a drop of adhesive mass having good wetting ability and sufficient initial adhesiveness, the mass may neither polymerize initially nor gelate at least during this period of 100 sec.; thus, it must comprise a pot life of more than 100 sec. This may easily be achieved in applying the method in accordance with the invention, in contrast to the methods in accordance with the prior art mentioned in the foregoing. The method according to the invention also allows to charge substantially larger circuit boards with substantially more components according to SMT-technique, with manual operation using a SMD-manipulator also being possible instead of a charging apparatus, although the pot life required may be up to 60 min. in this case.

One further field of application for the method according to the invention are joining methods which distinguish themselves by extensive pre-coating of the parts to be bonded with adhesive agent and wherein final mounting of the substrates to be bonded may only take place afterwards. Body or trimming parts of motor vehicles, that is, of land, air and water craft, but also sealings for motor vehicle and other windows and doors and profiles of all kinds may be used as substrates as well, irrespective of what kind of materials they consist of. The substrates may consist of metal, plastics, glass, ceramics, rubber, paper, cardboard or textile materials, or composite materials from several of the aforementioned materials may be concerned.

Long beads of the cationically polymerizable mass used as adhesive agent have to be applied to the body in bonding and sealing in car construction, in sliding roof frames or bonnet struttings, for instance. The bead length may go beyond 3 m for sliding roof frames and beyond 5 m in bonnet struttings. A common robot having an application speed of 5 cm/sec. needs, in the case of the sliding roof frame, more than 60 sec., and more than 100 sec. in the case of the bonnet strutting for applying the adhesive bead. Thus, the pot life of the masses has to be more than 60 to 100 sec. respectively without the time required for conveying the activated adhesive mass from the place of activation to the place of the application device being taken into account. Only after this period has elapsed is it possible to bring the sliding roof frame or the bonnet strutting respectively onto the adhesive bead and to start hardening. Thus, the method according to the invention ideally fulfils all conditions for application in such a joining method.

A further advantage of the method according to the invention results from the fact that photo-activated masses allow post-calibration after joining of the substrates.

Thus, it is necessary, in bonding the set screw of a thermostat or overload release device for instance, to mount the thermostat or overload device after applying the adhesive mass to the thread of the set screw and to calibrate it on a test stand by means of the set screw. The set screw must still be rotatable for this purpose, which is easily possible due to the long pot life achieved in accordance with the invention. It is only after the switching point is adjusted that the adhesive mass in the set screw thread is hardened so that misadjustment is no longer possible. An overall time of about 15 to 20 min is needed for the whole process from application of the adhesive agent onto the set screw till adjustment of the switching point and hardening of the adhesive mass. This requirement is also ideally met by the method in accordance with the invention.

In another group of technical joining methods, the adhesive mass is applied to the substrates to be bonded in a screen or mask printing method. It is necessary here that the masses be applied to the sieve over a prolonged period and remain unlimitedly applicable until being applied onto the substrates through the sieve or the mask by means of a doctor blade. This requires periods of some minutes up to 1 h. This application is also possible with the method in accordance with the invention.

In other applicational cases, the polymerizable masses may be distributed to several working places via pumps and longer pipings after their photo-activation in accordance with the invention. Pot lives of several minutes up to 1 h are necessary depending on the flow rate of the mass in the pipings.

A prolonged pot life situated in the range of some minutes to 1 h is equally needed when multiple tools for potting a plurality of parts have to be supplied with the masses simultaneously from a central container. The method according to the invention is excellently suitable for these cases of application, too.

One further advantageous application of the method in accordance with the invention consists in carrying out photo-activation of the masses in a central device, in a transparent container, for instance, and to subsequently apply the activated masses onto the substrates by means of a commercial application or dosing system. Thus, it is possible for instance to activate 500 g of the light-activatable masses under a DELO-LUX 450 lamp from Delo and to subsequently transfer them to the pressure container of an automatic dosing machine (DELOMAT 926 from Delo). The activated adhesive is applied onto the substrate from the pressure container via tubings and a dispenser tip. According to the respective conveying speed, a pot life of some minutes up to 1 h is necessary for emptying the container completely.

However, it is also possible to activate the masses in a transparent cartouche (type VPE from GLT, Pforzheim) and to apply them subsequently using a dosing device (type 1000 DE from GLT). This requires a mass pot life of some minutes to 1 h, which is easily achieved by means of the method in accordance with the invention.

One further advantage consists in that, due to their prolonged pot lifes, the masses photo-activated in accordance with the invention do not result in immediate conglutination of the pipings wetted with the activated masses or of other mechanical parts in the case of a disturbance in the automated manufacturing process. Rather, it is possible to eliminate the disturbance within a period of some minutes up to 1 h or, if the disturbance cannot be eliminated within 1 h, to clean the machine parts contaminated by the masses before the masses begin to harden.

The method according to the invention quite generally further comprises the following advantages: low volatility and viscosity as well as low toxic potential of the monomers to be used, no reaction inhibition by atmospheric oxygen and, consequently, no smeary layers, excellent adhesion on different substrates, excellent chemical and physical properties of the polymerized masses as well as high storage stability of the non-activated masses.

We claim:

1. In a method for bonding or potting substrates by means of cationically polymerizable masses being photo-activated before joining or potting by irradiation with visible light and curing after the joining or potting of the substrates without irradiation being continued, the improvement wherein the exposure for photo-activation of said masses by irradiation with light in the wavelength range of 400 to 600 nm is carried out before said masses are applied onto the surfaces of said substrates and for so long that the pot life during which the masses may be applied unlimitedly is at least 30 sec. after exposure is finished.

2. The method of claim 1, wherein said exposure for photo-activation of said masses is carried out for so long that the pot life during which the masses may be applied unlimitedly is at least 100 sec. after exposure is finished.

3. The method of claim 1, wherein said masses are exposed for 0.5 to 300 sec. for photo-activation.

4. The method of claim 1, 2 or 3, wherein said photo-activation of said masses is carried out by irradiation with light having a wavelength of 420 to 580 nm.

5. The method of claim 4, wherein said wavelength is 480 to 520 nm.

6. The method of claim 1, wherein said curing of said photo-activated masses after said joining or potting respectively of the substrates is carried out for a period of up to 10 minutes at a temperature of $>60°$ C. and $<149°$ C.

7. The method of claim 6, wherein said curing is carried out for a maximum of 2 minutes.

8. The method of claim 1, wherein a flowable photo-activatable mass having a viscosity of 0.05 to 1000 Pa.s is used as the cationically polymerizable mass.

9. The method of claim 8, wherein said viscosity is 0.4 to 200 Pa.s.

10. The method of claim 1, wherein a mass is used consisting essentially of:
   a) 10 to 99.95 wt.-% of at least one cationically hardenable resin and/or cationically polymerizable monomer;
   b) 0.05 to 10 wt.-% of at least one photo-initiator forming Lewis or Brönsted acids under the influence of light;
   c) 0 to 89.95 wt.-% of one or several fillers, thixotroping agents, coupling agents and/or other conventional additives.

11. The method of claim 10, wherein a mass is used consisting essentially of:
   a) 70 to 98 wt.-% of at least one cationically hardenable resin and/or cationically polymerizable monomer;
   b) 2 to 6 wt.-% of at least one photo-initiator forming Lewis or Brönsted acids under the influence of light;
   c) 0 to 28 wt.-% of one or several fillers, thixotroping agents, coupling agents and/or other conventional additives.

12. The method of claim 10 or 11, wherein component a) of said mass consists essentially of the diglycidyl ethers of divalent phenols and/or divalent aliphatic alcohols.

13. The method of claim 1, wherein said polymerizable masses are applied onto said substrates in the form of drops, beads or continuous layers.

14. The method of claim 1, wherein said polymerizable masses are applied onto the substrates in a screen or mask printing process.

* * * * *

UNITED STATES PATENT AND TRADEMARK OFFICE
CERTIFICATE OF CORRECTION

PATENT NO. : 5,154,791
DATED : October 13, 1992
INVENTOR(S) : Gasser et al.

It is certified that error appears in the above—identified patent and that said Letters Patent is hereby corrected as shown below:

Column 12, claim 6, line 12, "149° C." should be deleted and replaced with --140° C.--

Signed and Sealed this

Fifth Day of October, 1993

Attest:

BRUCE LEHMAN

Attesting Officer            Commissioner of Patents and Trademarks